(12) United States Patent
Aoyama et al.

(10) Patent No.: US 7,718,303 B2
(45) Date of Patent: May 18, 2010

(54) MEMBRANE-ELECTRODE ASSEMBLY AND FUEL CELL

(75) Inventors: Satoshi Aoyama, Susono (JP); Satoshi Iguchi, Mishima (JP); Makoto Taniguchi, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 448 days.

(21) Appl. No.: 11/659,539

(22) PCT Filed: Aug. 17, 2005

(86) PCT No.: PCT/IB2005/002441

§ 371 (c)(1), (2), (4) Date: Feb. 28, 2007

(87) PCT Pub. No.: WO2006/018705

PCT Pub. Date: Feb. 23, 2006

(65) Prior Publication Data

US 2007/0248872 A1 Oct. 25, 2007

(30) Foreign Application Priority Data

Aug. 18, 2004 (JP) ............................. 2004-238017

(51) Int. Cl.
*H01M 4/00* (2006.01)

(52) U.S. Cl. .................... 429/40; 502/183; 439/717

(58) Field of Classification Search .............. 439/717; 429/40; 502/183
See application file for complete search history.

(56) References Cited

U.S. PATENT DOCUMENTS 6,330,871 B1 * 12/2001 Jufuku et al. ............ 123/193.3
6,645,659 B2 * 11/2003 Bisaka et al. ................ 429/37
2002/0020298 A1    2/2002 Drost et al.
2003/0061937 A1    4/2003 Ito et al.
2004/0043277 A1    3/2004 Ito et al.
2006/0141320 A1    6/2006 Sato et al.

FOREIGN PATENT DOCUMENTS

| EP | 1 300 188 A2 | 4/2003 |
| EP | 1 394 884 A2 | 3/2004 |
| EP | 1394884 * | 3/2004 |
| EP | 1394884 A2 * | 3/2004 |
| EP | 1 619 736 A1 | 1/2006 |
| JP | A 5-299105 | 11/1993 |
| JP | A 2000-331692 | 11/2000 |
| JP | A 2003-203670 | 7/2003 |
| WO | WO 2005/102918 A1 | 11/2005 |

* cited by examiner

*Primary Examiner*—Melvin C Mayes
*Assistant Examiner*—Bijay S Saha
(74) *Attorney, Agent, or Firm*—Oliff & Berridge, PLC

(57) ABSTRACT

An electrolyte layer (121) and a hydrogen-permeable metal layer (122) are fitted in a fitting portion (131) of a low thermal expansion member (130), and a cathode electrode (110) is provided on the electrolyte layer (121). Gas separators (100, 150) are provided such that a low thermal expansion member (130) is held between the gas separators (100, 150). Since the low thermal expansion member (130) is made of metal which has a thermal expansion coefficient lower than that of the hydrogen-permeable metal layer (122), thermal expansion of the hydrogen-permeable metal layer (122) can be suppressed. Accordingly, it is possible to reduce shear stress applied to an interface between the electrolyte layer (121) and the hydrogen-permeable metal layer (122) due to the thermal expansion. It is possible to suppress separation of the electrolyte layer (121) from the hydrogen-permeable metal layer (122) and occurrence of a crack in the electrolyte layer (121).

7 Claims, 12 Drawing Sheets

MEMBRANE-ELECTRODE ASSEMBLY AND FUEL CELL

FIELD OF THE INVENTION

The low thermal expansion member may include a fitting portion which is formed so as to have a recess portion on a surface thereof on which the hydrogen-permeable metal layer is provided, and the hydrogen-permeable metal layer may be fitted in the fitting portion. With this configuration, since the low thermal expansion member has a thermal expansion coefficient lower than that of the hydrogen-permeable metal layer, it is possible to suppress the thermal expansion of the hydrogen permeable metal layer from side surfaces.

BACKGROUND OF THE INVENTION

The low thermal expansion member 130 is a member made of a material having a low thermal expansion coefficient. In this embodiment, the low thermal expansion member 130 is made of SUS430. The low thermal expansion member 130 may be made of Kovar, or the like. In the low thermal expansion member 130, a fitting portion 131, and plural fuel gas passages 132 are formed. The fitting portion 131 is formed so as to have a recess portion. The plural fuel gas passages 132 are formed so as to penetrate a bottom surface of the fitting portion 131.

However, hydrogen separation metal has a high thermal expansion coefficient and a high hydrogen expansion coefficient, whereas ceramics has a low coefficient thermal expansion and a low hydrogen expansion coefficient. Therefore, compression stress is applied to the hydrogen separation metal, and tensile stress is applied to the ceramics due to heat that is generated when the fuel cell is operated. Accordingly, there is a problem that the ceramics is separated from the hydrogen separation metal at an interface therebetween due to the stress.

When the hydrogen separation metal and the ceramics are made thin, hydrogen-permeability can be increased, and performance of the fuel cell can be improved. However, when the hydrogen separation metal and the ceramics are made thin, there is the problem that the ceramics is likely to be broken or separated from the hydrogen separation metal.

DISCLOSURE OF THE INVENTION

It is an object of the invention to reduce stress applied to an electrolyte membrane with which hydrogen separation metal is coated.

According to an aspect of the invention, a membrane-electrode assembly includes a hydrogen-permeable metal layer containing hydrogen-permeable metal; an electrolyte layer with proton conductivity which is provided on the hydrogen-permeable metal layer; and a low thermal expansion member provided on a surface of the hydrogen-permeable metal layer, the surface being opposite to a surface of the hydrogen-permeable metal layer on which the electrolyte layer is provided. A thermal expansion coefficient of the low thermal expansion member is lower than that of the hydrogen-permeable metal layer.

With this configuration, it is possible to suppress thermal expansion which occurs in the hydrogen-permeable metal layer due to heat that is generated when a fuel cell is operated, and to suppress shear stress which occurs at an interface between the hydrogen-permeable metal layer and the electrolyte layer. Accordingly it is possible to prevent separation of the electrolyte layer from the hydrogen-permeable metal layer, and occurrence of a crack in the electrolyte layer.

The low thermal expansion member may include a fitting portion which is formed so as to have a concave shape on a surface thereof on which the hydrogen-permeable metal layer is provided, and the hydrogen-permeable metal layer may be fitted in the fitting portion. With this configuration, since the low thermal expansion member has a thermal expansion coefficient lower than that of the hydrogen-permeable metal layer, it is possible to suppress the thermal expansion of the hydrogen permeable metal layer from side surfaces.

A passage for supplying reaction gas to the hydrogen-permeable metal layer may be formed on a bottom of the fitting portion so as to penetrate the low thermal expansion member. With this configuration, it is possible to promote permeation of gas containing hydrogen through the penetration holes. Accordingly, it is possible to improve operating efficiency of the fuel cell.

A fuel cell may include the membrane-electrode assembly, and a pair of separators between which the membrane-electrode assembly is held. The hydrogen-permeable metal layer may serve as an anode electrode, and the membrane-electrode assembly may include a cathode electrode. The fuel cell may further include a stress relaxing member which is provided on a surface of the low thermal expansion member, the surface being opposite to a surface of the low thermal expansion member on which the hydrogen-permeable metal layer is provided; the stress member has rigidity lower than that of the low thermal expansion member; and a portion of the stress relaxing member may be partly fixed to at least one of the pair of separators, the portion having no contact with the low thermal expansion member. With this configuration, the stress relaxing member having rigidity lower than that of the low thermal expansion member absorbs the stress that is applied to the low thermal expansion member due to heat that is generated when the fuel cell is operated. Thus, it is possible to suppress deformation of the low thermal expansion member. Accordingly, it is possible to suppress separation of the electrolyte layer from the hydrogen permeable metal layer, and occurrence of a crack in the electrolyte layer.

The membrane-electrode assembly is provided such that a predetermined space is provided between the membrane-electrode assembly and the pair of separators in a direction perpendicular to a direction in which the hydrogen-permeable metal layer, the electrolyte layer, and the low thermal expansion member are stacked. With this configuration. The predetermined space is large enough to allow the membrane-electrode assembly and the separators to be expanded by heat. Also, it is possible to provide the necessary space for allowing the stress relaxing member to be deformed.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EXEMPLARY EMBODIMENTS

Hereinafter, embodiments of the invention will be described in the order described below.

A. First Embodiment

A1. Configuration of unit cell of fuel cell
A2. Low thermal expansion member
A3. Stress applied to electrolyte membrane
A4. Modified example of the first embodiment

B. Second Embodiment

B1. Configuration of unit cell of fuel cell
B2. Stress relaxing member
B3. Stress applied to electrolyte membrane
B4. Modified example of the second embodiment

C. Modified Example

A. First Embodiment

A1. Configuration of Unit Cell of Fuel Cell

Figure 1:
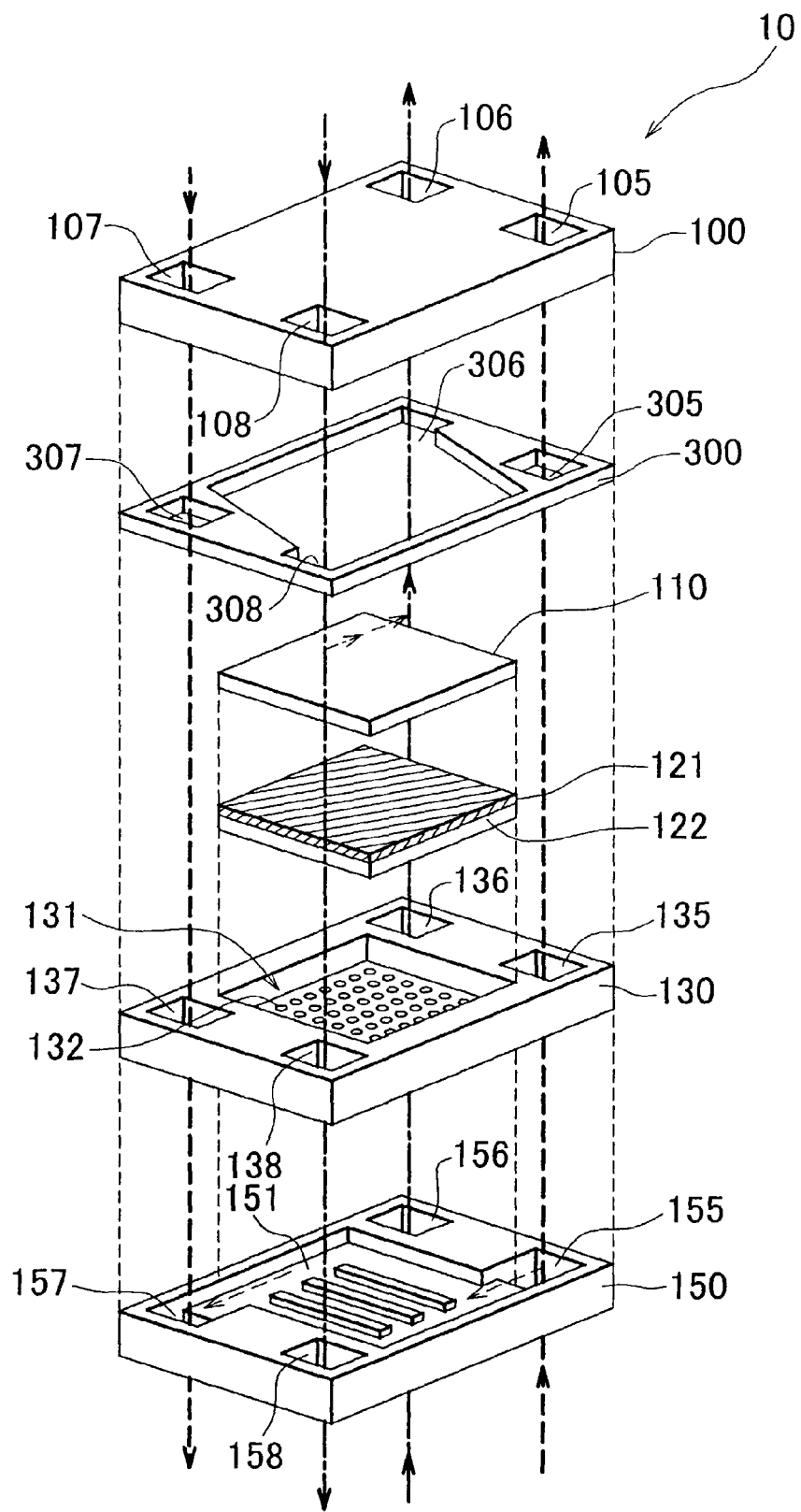
FIG. 1 is an exploded perspective view showing a unit cell of a fuel cell according to a first embodiment of the invention.

FIG. 1 is an exploded perspective view showing a unit cell 10 of a fuel cell according to a first embodiment of the invention. The unit cell 10 includes a gas separator 100; an insulating member 300; a cathode electrode 110; an electrolyte layer 121; a hydrogen-permeable metal layer 122; a low thermal expansion member 130; and a gas separator 150, which are stacked in the order shown in FIG. 1. The gas separator 100 has penetration holes 105 to 108. The insulating member 300 has penetration holes 305 to 308. The low thermal expansion member 130 has penetration holes 135 to 138. The gas separator 150 has penetration holes 155 to 158. The penetrations holes form a manifold when these members are stacked. In FIG. 1, a dashed line arrow indicates a flow of fuel gas. A chain line arrow indicates a flow of oxidizing gas.

An oxidizing gas passage for supplying oxidizing gas containing oxygen is formed on the insulating member 300-side surface of the gas separator 100. Also, a fuel gas passage 151 for supplying fuel gas containing hydrogen to the hydrogen-permeable metal layer 122 is formed in the gas separator 150. Hereinafter, a structure composed of the cathode electrode 110, the electrolyte layer 121, the hydrogen-permeable metal layer 122, and the low thermal expansion member 130 will be referred to as "MEA (Membrane-electrode assembly)". Although FIG. 1 shows the unit cell 10, an actual fuel cell has a stack structure formed by stacking plural unit cells 10. In order to adjust a temperature inside the stack structure, a cooling medium passage through which a cooling medium flows may be provided between every two unit cells, or may be provided for every predetermined number of unit cells.

The hydrogen-permeable metal layer 122 is made of metal with hydrogen-permeability. For example, the hydrogen-permeable metal layer 122 may be made of palladium (Pd), or palladium alloy (Pd alloy). Also, the hydrogen-permeable metal layer 122 may be made of metal of group V such as vanadium (V), niobium, and tantalum. Also, the hydrogen-permeable metal layer 122 may be a multi-layer membrane formed by using alloy of group V as a base material, and forming a Pd layer or a Pd alloy layer at least on the fuel gas passage 151-side. In the hydrogen-permeable metal layer 122, Pd which constitutes at least a surface on the gas separator 150 side, that is, on the low thermal expansion member 130 side has activity of dissociating a hydrogen molecule when hydrogen passes through the hydrogen-permeable metal layer 122. The hydrogen-permeable metal layer 122 is coated with the electrolyte layer 121. The hydrogen-permeable metal layer 122 is electric conductive. The hydrogen-permeable metal layer 122 itself functions as an anode electrode.

The electrolyte layer 121 is made of solid electrolyte with proton conductivity. As the solid electrolyte constituting the electrolyte layer 121, it is possible to use, for example, a proton conductor made of $BaCeO_3$ ceramics or $SrCeO_3$ ceramics.

The cathode electrode 110 is a porous layer formed on the electrolyte layer 121. The cathode electrode 110 is made of a material having a catalytic activity for promoting electrochemical reaction. The cathode electrode 110 is made of lanthanum strontium manganate ($La_{0.6}Sr_{0.4}MnO_3$), and lanthanum strontium cobaltite ($La_{0.6}Sr_{0.4}CoO_3$). The electrolyte layer 121 is coated with the cathode electrode 110 with thickness of a few μm to a few tens of μm by a Sol-Gel method, a screen printing method, a PVD method, and the like.

The gas separators 100 and 150 are gas-impermeable members made of a conductive material such as carbon and metal. On the surface of the gas separator 100, predetermined concavities and convexities which constitute the aforementioned oxidizing gas passage are formed. On the surface of the gas separator 150, predetermined concavities and convexities which constitute the aforementioned fuel gas passage 151 are formed.

The low thermal expansion member 130 is a member made of a material having a low thermal expansion coefficient. In this embodiment, the low thermal expansion member 130 is made of SUS430. The low thermal expansion member 130 may be made of Kovar, or the like. In the low thermal expansion member 130, a fitting portion 131, and plural fuel gas passages 132 are formed. The fitting portion 131 is formed so as to have a concave shape. The plural fuel gas passages 132 are formed so as to penetrate a bottom surface of the fitting portion 131.

As the fuel gas supplied to the fuel cell, it is possible to use hydrogen rich gas obtained by reforming hydrocarbon fuel, or to use hydrogen gas with high purity. Also, as the oxidizing gas supplied to the fuel cell, for example, air can be used.

A2. Low Thermal Expansion Member

Figure 2A:
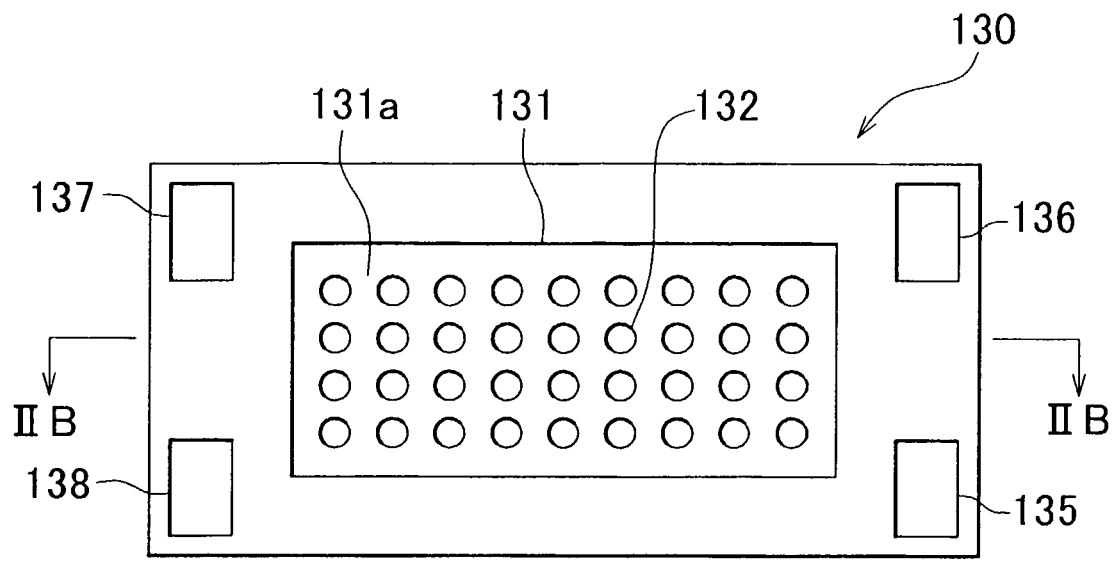
FIG. 2A and FIG. 2B are explanatory diagrams each showing a structure of a low thermal expansion member according to the first embodiment of the invention.
Figure 2B:
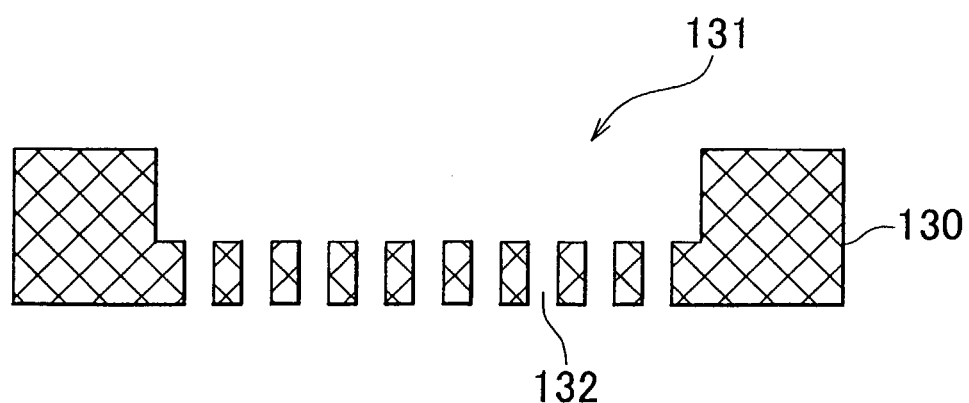

FIG. 2A and FIG. 2B are explanatory diagrams each showing a structure of the low thermal expansion member 130 according to this embodiment of the invention. FIG. 2A is a plan view showing the low thermal expansion member 130, seen from the hydrogen-permeable metal layer 122 side.

In the low thermal expansion member 130, the fitting portion 131, the fuel gas passages 132, the penetration holes 135 to 138 are formed. The fitting portion 131 is formed so as to have substantially the same shape as the shape of the hydrogen-permeable metal layer 122. The hydrogen-permeable metal layer 122 is fitted into the fitting portion 131. The plural fuel gas passages 132 are penetration holes formed on a bottom portion 131a of the fitting portion 131. FIG. 2B is a sectional view of the low thermal expansion member 130 taken along line IIB-IIB in FIG. 2A. As shown in FIG. 2B, the fuel gas passages 132 are formed on the bottom surface of the fitting portion 131 so as to penetrate the low thermal expansion member 130. It is preferable that thickness of the low thermal expansion member 130 should be larger than that of the hydrogen-permeable metal layer 122 from a view point of strength.

Figure 3:
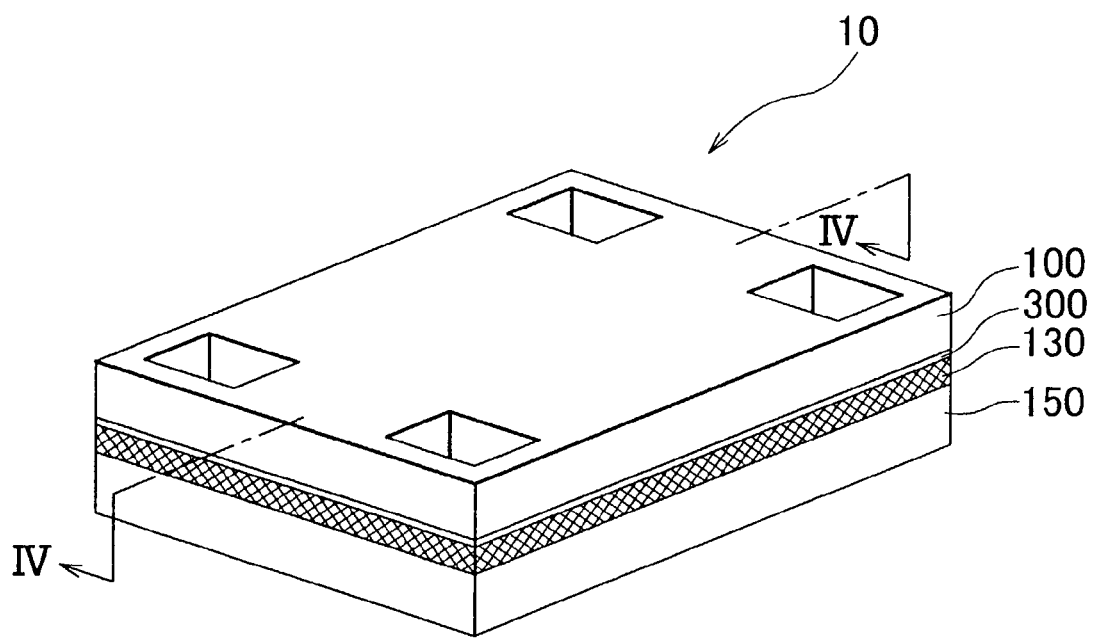
FIG. 3 is a perspective view showing the unit cell according to the first embodiment of the invention.
Figure 4:
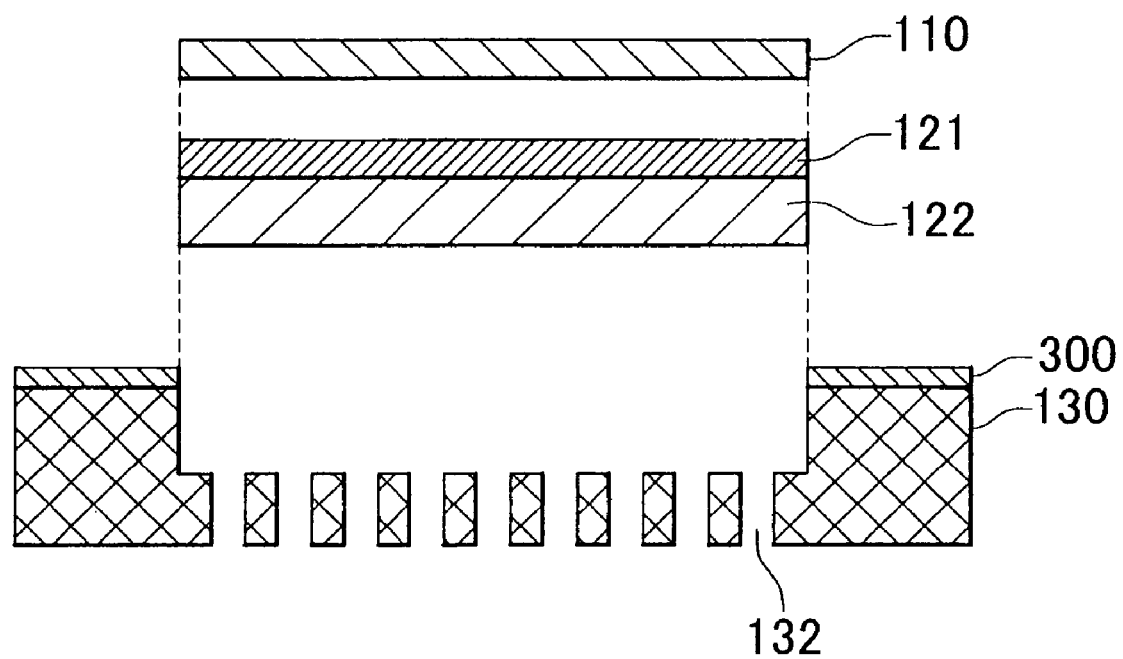
FIG. 4 is an exploded sectional view showing the unit cell according to the first embodiment of the invention.

FIG. 3 is a perspective view showing the unit cell 10 according to this embodiment of the invention. The unit cell 10 is formed by stacking the aforementioned members. As shown in FIG. 3, the insulating member 300 and the low thermal expansion member 130 are held between the gas separators 100 and 150. FIG. 4 is a sectional view taken along an arrow IV-IV in FIG. 3.

FIG. 4 is an exploded sectional view showing the unit cell 10 according to this embodiment of the invention. In FIG. 4, the gas separators 100 and 150 are omitted. The hydrogen-permeable metal layer 122 is fitted in the fitting portion 131 of the low thermal expansion member 130. The cathode electrode 110 is formed on the electrolyte layer 121. The insulating member 300 is provided on the cathode electrode-side of the low thermal expansion member 130.

A3. Stress Applied to Electrolyte Membrane

Figure 5:
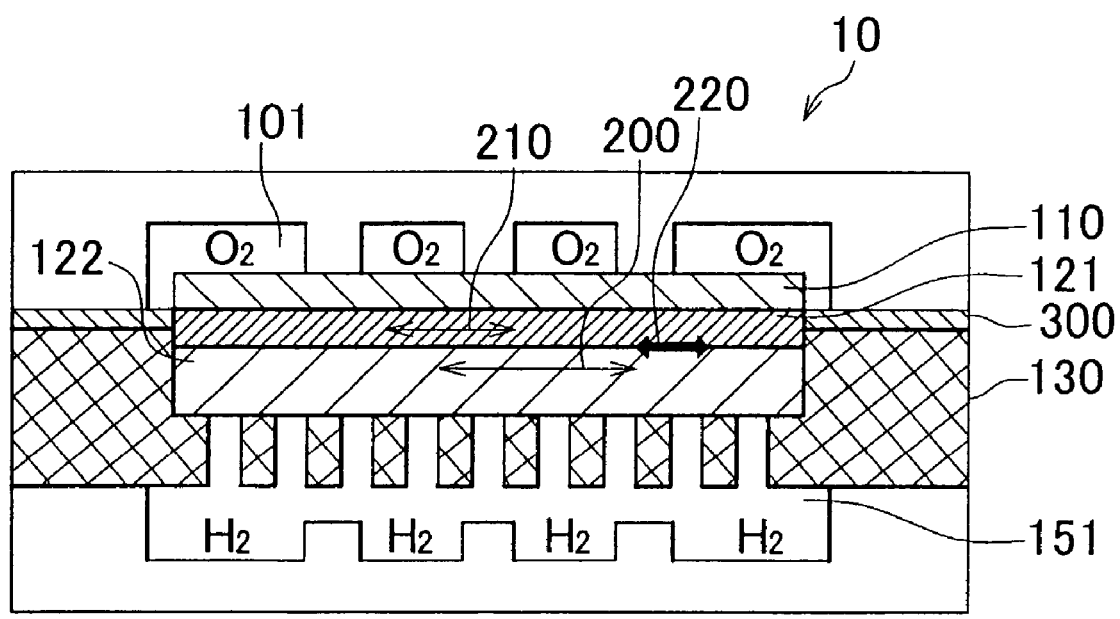
FIG. 5 is a sectional view showing the unit cell according to the first embodiment of the invention.

FIG. 5 is a sectional view showing the unit cell 10 according to this embodiment of the invention. In FIG. 5, the members shown in the exploded sectional view in FIG. 4 are stacked. The hydrogen-permeable metal layer 122 is fitted in the fitting portion 131 of the low thermal expansion member 130. The cathode electrode 110 is formed on the electrolyte layer 121. The gas separators 100 and 150 are provided such that the low thermal expansion member 130 is held between the gas separators 100 and 150. A principle of operation of the fuel cell according to this embodiment will be described with reference to FIG. 5.

When the fuel gas containing hydrogen is supplied to the fuel gas passage 151, the fuel gas is supplied to the hydrogen-permeable metal layer 122. Hydrogen in the fuel gas is divided into a proton and an electron on the hydrogen-permeable metal layer 122. The proton moves to the cathode electrode 110 through the electrolyte layer 121. Meanwhile, the electron is supplied to a predetermined electric circuit (not shown) which connects the cathode electrode 110 and the hydrogen-permeable metal layer 122. Thus, the electron moves to the cathode electrode 110. In the cathode electrode 110, oxygen in the oxidizing gas supplied to the oxidizing gas passage 101, the electron that has reached the cathode electrode 110 through the predetermined electric circuit, and the proton that has reached the cathode electrode 110 through the electrolyte layer 121 react with each other. As a result, water is produced, and the water adheres to a surface of the cathode electrode 110. The fuel cell generates electric power on this principle.

When the fuel cell generates electric power, the temperature of the fuel cell becomes high. Therefore, thermal expansion occurs in the hydrogen-permeable metal layer 122, the electrolyte layer 121, and the low thermal expansion member 130. Also, when hydrogen is divided into the proton and the electron, hydrogen expansion occurs in the hydrogen-permeable metal layer 122. Also, when the proton passes through the electrolyte layer 121, hydrogen expansion occurs in the electrolyte layer 121. Since the low thermal expansion member 130 has the thermal expansion coefficient lower than that of the hydrogen-permeable metal layer 122, the degree of expansion of the low thermal expansion member 130 is smaller than that of the hydrogen-permeable metal layer 122. Therefore, it is possible to suppress expansion of the hydrogen-permeable metal layer 122. As a result, it is possible to suppress compression stress 200 applied to the hydrogen-permeable metal layer 122, and to reduce tensile stress 210 applied to the electrolyte layer 121 with which the hydrogen-permeable metal layer 122 is coated. Thus, it is possible to reduce shear stress 220 at the interface between the electrolyte layer 121 and the hydrogen-permeable metal layer 122, which is caused when both of the electrolyte layer 121 and the hydrogen-permeable metal layer 122 are deformed by the stress applied thereto.

In the fuel cell according to the first embodiment of the invention that has been described, it is possible to reduce shear stress at the interface between the electrolyte layer and the hydrogen-permeable metal layer, which is caused when both of the electrolyte layer and the hydrogen-permeable metal layer are deformed by the stress applied thereto. Accordingly, it is possible to suppress separation of the electrolyte layer from the hydrogen-permeable metal layer, and occurrence of a crack in the electrolyte layer.

A4. Modified Example of the First Embodiment

Figure 6A:
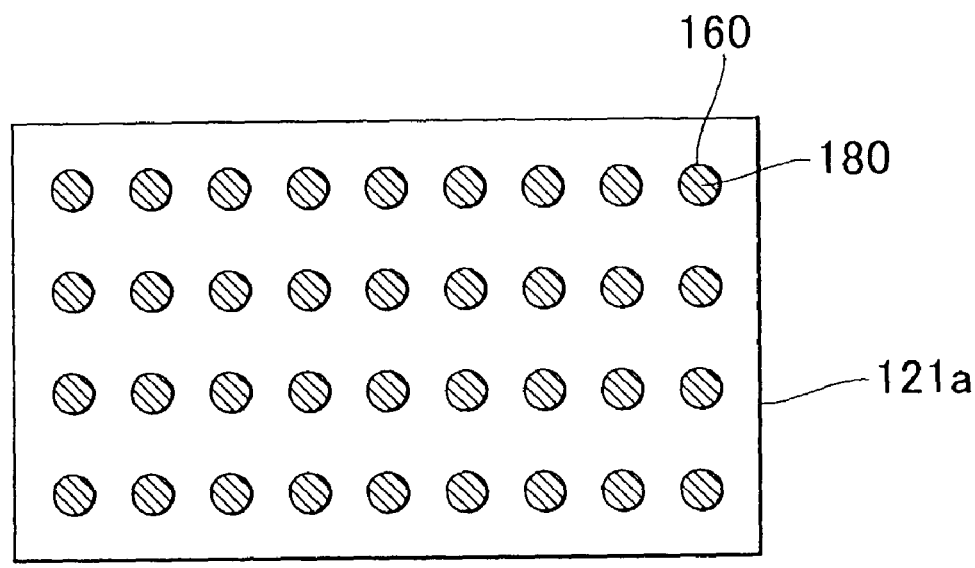
FIG. 6A and FIG. 6B are explanatory diagrams each showing a modified example of the first embodiment of the invention.
Figure 6B:
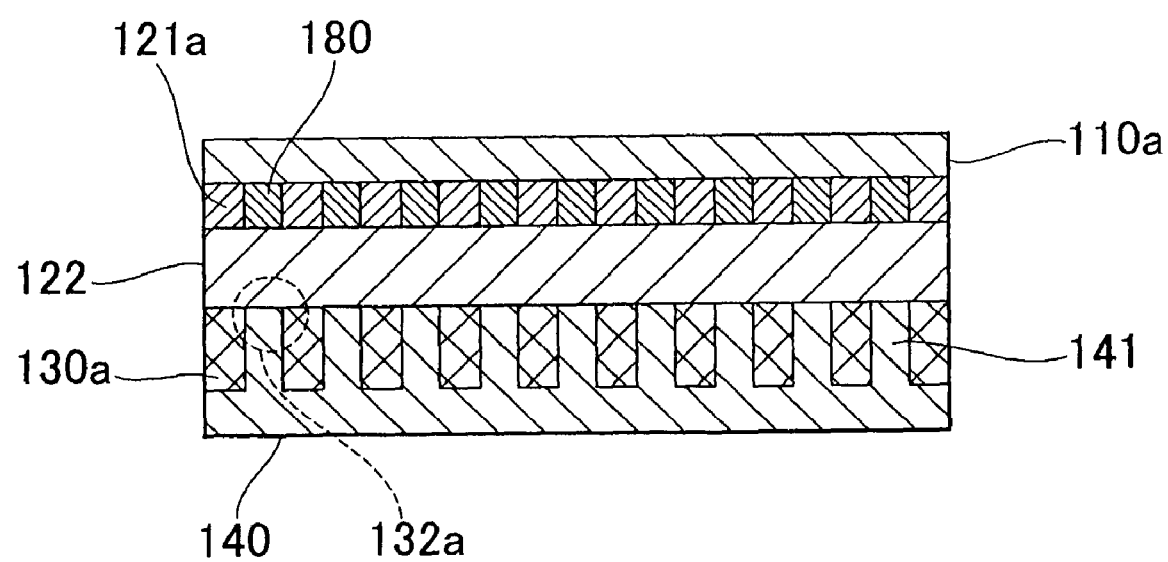

FIG. 6A and FIG. 6B are explanatory diagrams each showing a modified example of the first embodiment of the invention. In the aforementioned embodiment, the low thermal expansion member 130 includes the fitting portion 131. In the modified example, the thermal expansion of the hydrogen-permeable metal layer 122 is suppressed also from the electrolyte layer side. In the modified example, a low thermal expansion member 130a has the same shape as that of the hydrogen-permeable metal layer 122. The low thermal expansion member 130a is provided on a fuel supply-side of the hydrogen-permeable metal layer 122.

FIG. 6A is an explanatory diagram showing a structure of an electrolyte layer 121a. The electrolyte layer 121a is formed by performing masking for plural penetration holes 160, and coating the hydrogen-permeable metal layer 122 with an electrolyte. Next, masking is performed only for the electrolyte, and coating of an insulating material is performed to form an insulating body 180. As a method of performing coating of the insulating material, for example, a physical vapor deposition method such as a sputtering method or an ion plating method may be employed. As the insulating material, for example, $ZrO_2$ (zirconia) may be used.

As shown in FIG. 6B, in the modified example, the low thermal expansion member 130a including the plural penetration holes is provided on the fuel gas supply-side of the hydrogen-permeable metal layer 122.

A power collector 140 is made of porous carbon cloth. Since the porous carbon cloth has excellent conductivity, and has an excellent function of collecting electric power, it is appropriate to use the porous carbon cloth as the power collector 140. In the power collector 140, plural columnar-shaped convex portions 141 are formed so as to correspond to fuel gas passages 132*a* formed in the low thermal expansion member 130*a*. The concave portions 141 are inserted in the fuel gas passages 132*a* when the members are stacked. Since the power collector 140 is provided, the function of collecting electric power can be improved.

With the configuration in the modified example, it is possible to suppress the compression stress caused by the thermal expansion of the hydrogen-permeable metal layer 122 using the low thermal expansion member 130*a*, and to suppress the thermal expansion of the hydrogen-permeable metal layer 122 using the insulating body 180 which has a thermal expansion coefficient lower than that of the hydrogen-permeable metal layer 122. Accordingly, it is possible to reduce the shear stress between the hydrogen-permeable metal layer 122 and the electrolyte layer 121*a*, and to suppress separation of the electrolyte layer 121*a* from the hydrogen-permeable metal layer 122, and occurrence of a crack in the electrolyte layer 121*a*.

B. Second Embodiment

In the aforementioned first embodiment, the fitting portion 131 is formed in the low thermal expansion member 130, and the hydrogen-permeable metal layer 122 coated with the electrolyte layer 121 is fitted in the fitting portion 131. Thus, it is possible to suppress the thermal expansion and hydrogen expansion of the hydrogen-permeable metal layer 122, and to suppress the separation of the electrolyte layer 121 from the hydrogen-permeable metal layer 122 and occurrence of a crack in the electrolyte layer 121. In the second embodiment, it is possible to suppress deformation of the MEA which is caused when the fuel cell generates electric power, and to suppress the separation of the electrolyte layer 121 from the hydrogen-permeable metal layer 122 and occurrence of a crack in the electrolyte layer 121.

B1. Configuration of Unit Cell of Fuel Cell

Figure 7:
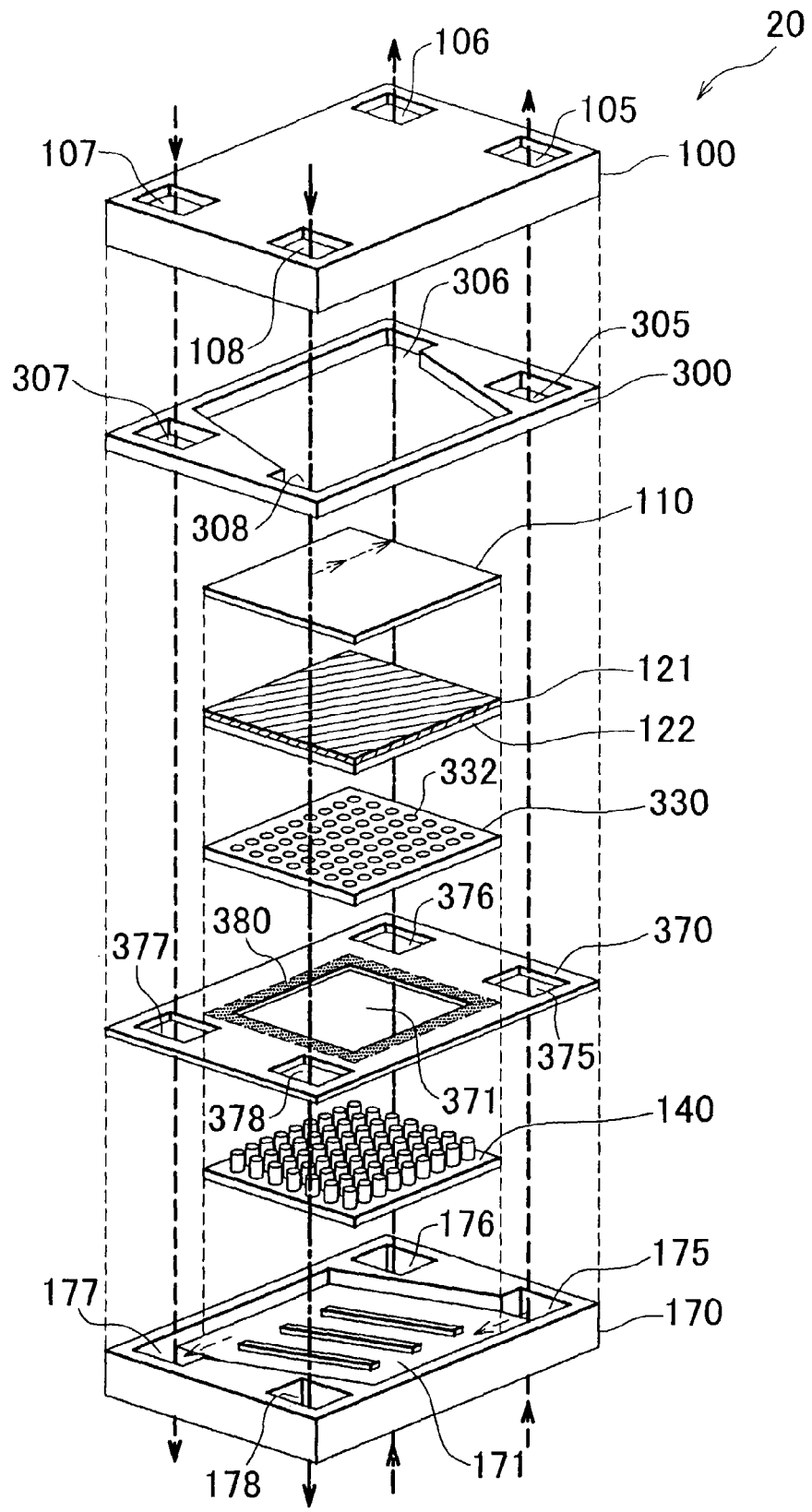
FIG. 7 is an exploded perspective view showing a unit cell of a fuel cell according to a second embodiment of the invention.

FIG. 7 is an exploded perspective view showing a unit cell 20 of a fuel cell according to a second embodiment of the invention. The unit cell 20 includes the gas separator 100, the insulating member 300, the cathode electrode 110, and the electrolyte layer 121, the hydrogen-permeable metal layer 122, a low thermal expansion member 330, a stress relaxing member 370, the power collector 140, and a gas separator 170, which are stacked in the order shown in FIG. 7. The gas separator 100 has the penetration holes 105 to 108. The insulating member 300 has the penetration holes 305 to 308. The stress relaxing member 370 has penetration holes 375 to 378. The gas separator 170 has penetration holes 175 to 178. The penetrations holes form a manifold when these members are stacked. In FIG. 7, a dashed line arrow indicates the flow of the fuel gas. A chain line arrow indicates the flow of the oxidizing gas. Since the configuration of each of the electrolyte layer 121, the hydrogen-permeable metal layer 122, the cathode electrode 110, and the power collector 140 is the same as in the first embodiment, description thereof will be omitted.

The oxidizing gas passage for supplying oxidizing gas containing oxygen is formed on the insulating member 300-side surface of the gas separator 100. Also, a fuel gas passage 171 for supplying fuel gas containing hydrogen to the hydrogen-permeable metal layer 122 is formed in the gas separator 170. The gas separators 100 and 170 are gas-impermeable members made of a conductive material such as carbon and metal. On the surface of the gas separator 100, predetermined concavities and convexities which constitute the aforementioned oxidizing gas passage are formed. On the surface of the gas separator 170, predetermined concavities and convexities which constitute the fuel gas passage 171 are formed.

The low thermal expansion member 330 is formed so as to have substantially the same shape as that of the hydrogen-permeable metal layer 122. The low thermal expansion member 330 is a member made of a material having a low thermal expansion coefficient. In this embodiment, the low thermal expansion member 330 is made of SUS430. However, the low thermal expansion member 330 may be made of koval steel, or the like. In the low thermal expansion member 330, plural fuel gas passages 332 are formed so as to penetrate the low thermal expansion member 330.

Figure 8:
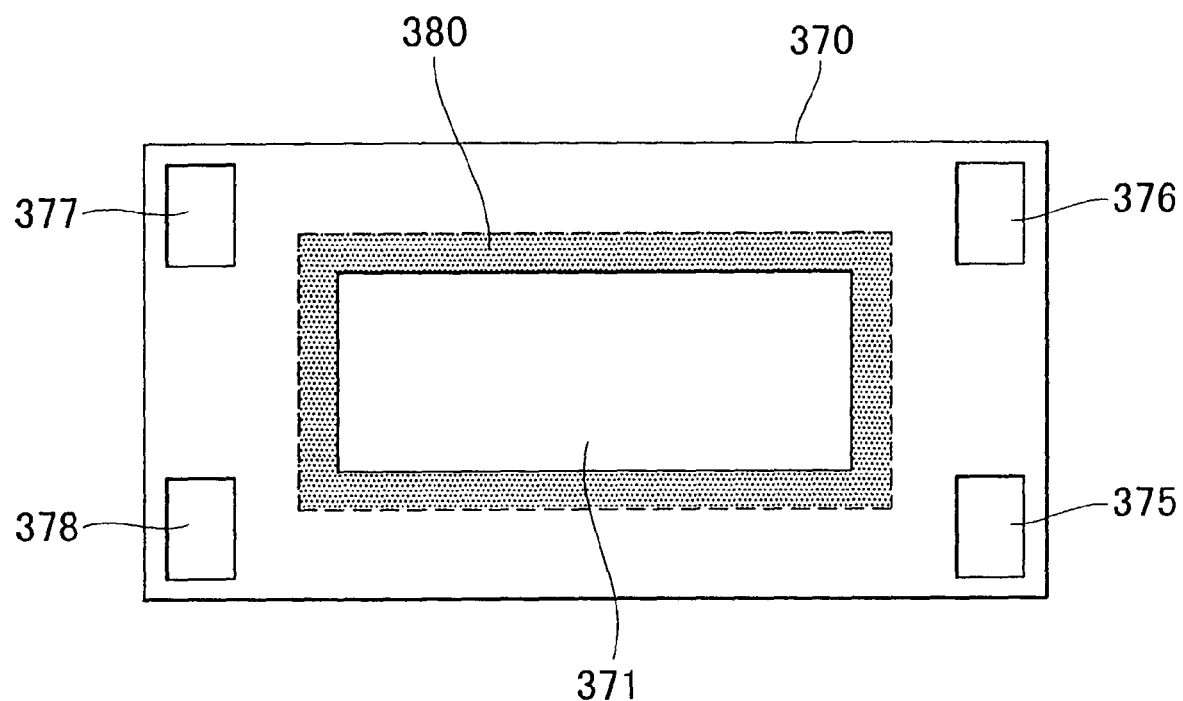
FIG. 8 is a plan view showing a stress relaxing member according to the second embodiment of the invention.

A gas passing portion 371 is formed in the stress relaxing member 370. The low thermal expansion member 330 is joined to the stress relaxing member 370 at a join region 380. FIG. 8 shows a structure of the stress relaxing member 370.

B2. Stress Relaxing Member

FIG. 8 is a plan view showing the stress relaxing member 370 according to this embodiment, which is seen from the low thermal expansion member 330 side. The stress relaxing member 370 is made of a material having rigidity lower than that of the hydrogen-permeable metal layer. In this embodiment, the stress relaxing member 370 is made of aluminum. As the material of the stress relaxing member 370, a material having rigidity lower than that of the hydrogen-permeable metal layer is used. For example, glass, gold, silver, lead, tin, duralumin, bismuth, polyethylene, polystyrene, zinc, nylon, titanium, quartz, and copper may be used.

In the stress relaxing member 370, the gas passing portion 371, and the penetration holes 375 to 378 are formed. A peripheral end portion of the low thermal expansion member 330 is joined to the join region 380 of the stress relaxing member 370. The join region 380 and the peripheral end portion of the low thermal expansion member 330 are joined to each other by brazing.

The gas passing portion 371 is formed as an opening portion in the stress relaxing member 370 at a region on which the low thermal expansion member 330 is provided, except the join region 380. The gas passing portion 371 is formed so that the convex portions 141 of the power collector 140 are not prevented from being fitted into the fuel gas passages 332 of the low thermal expansion member 330 when the members are stacked. The fuel gas passes through the fuel gas passages 332 via the power collector 140. In this embodiment, the gas passing portion 371 is formed so as to have a rectangular shape as shown in the figures. However, the gas passing portion 371 may have a circular shape or the like.

Figure 9:
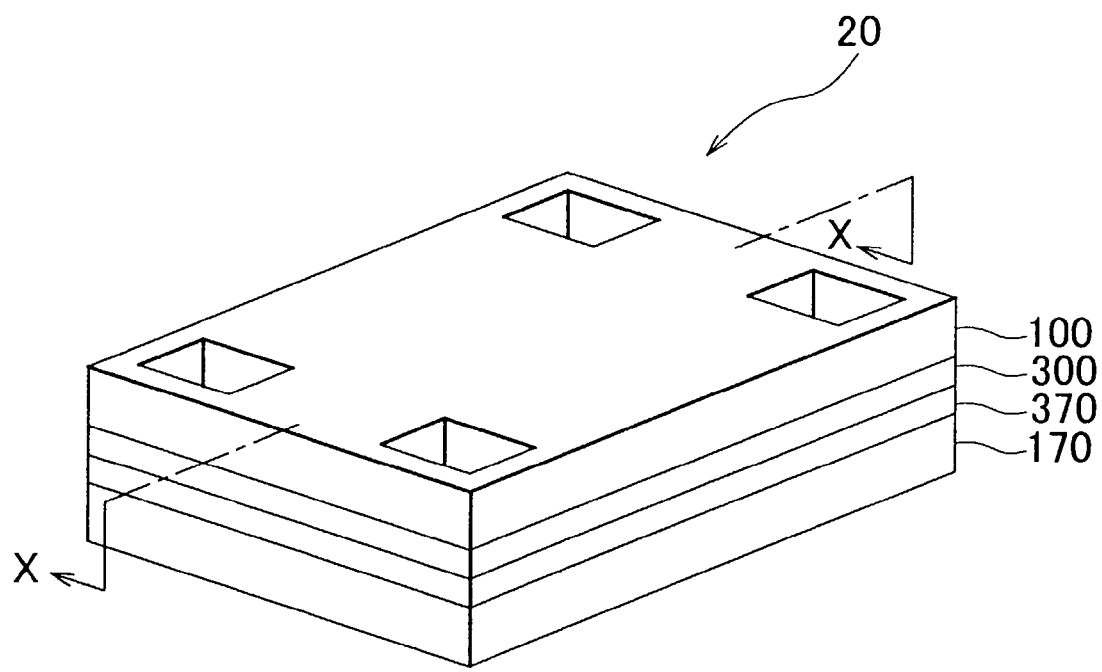
FIG. 9 is a perspective view showing the unit cell according to the second embodiment of the invention.
Figure 10:
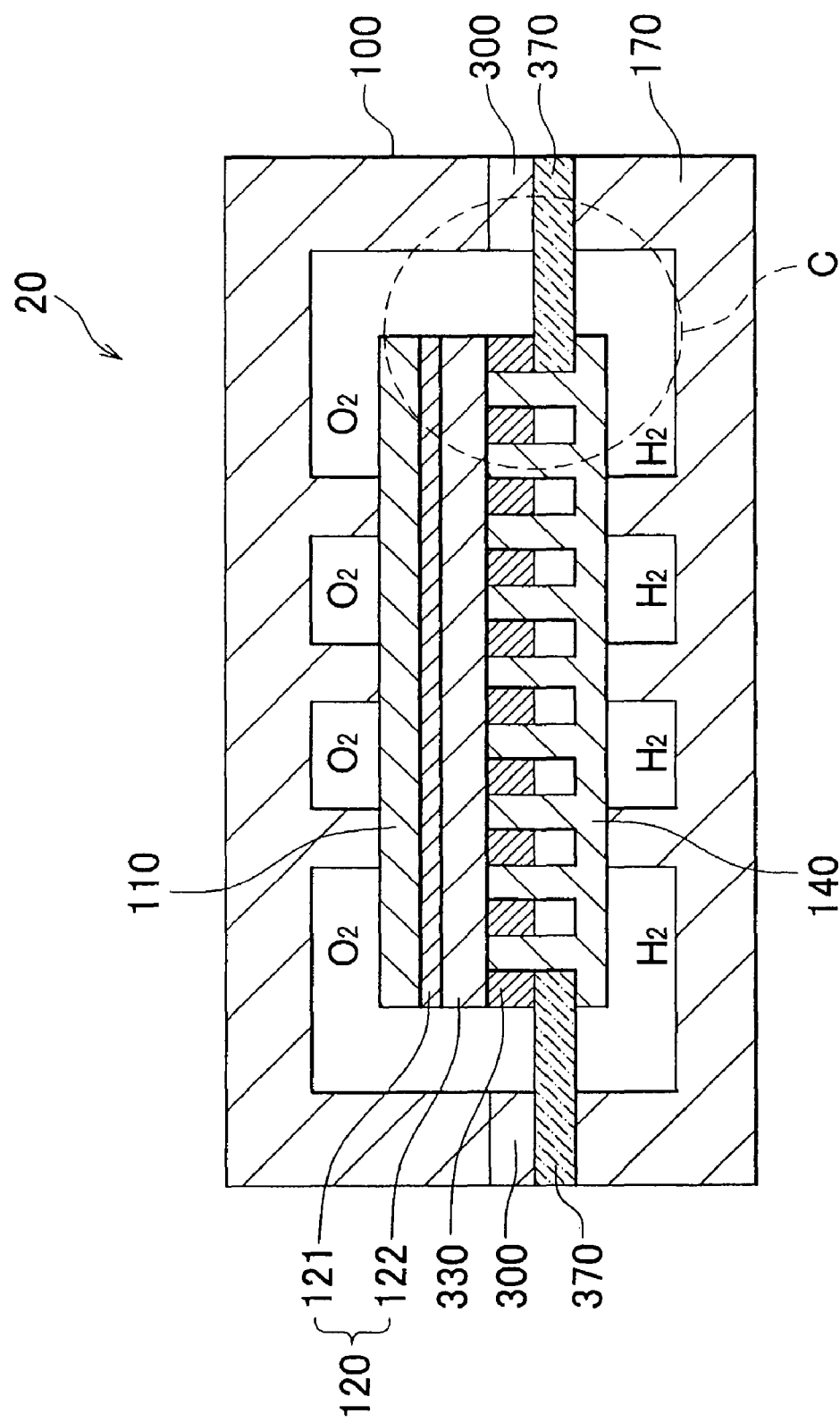
FIG. 10 is a sectional view showing the unit cell according to the second embodiment of the invention.

FIG. 9 is a perspective view showing the unit cell 20 according to this embodiment of the invention. As shown in FIG. 9, the insulating member 300 and the stress relaxing member 370 are held between the gas separators 100 and 170. FIG. 10 is a sectional view taken along an arrow X-X in FIG. 9.

Figure 11:
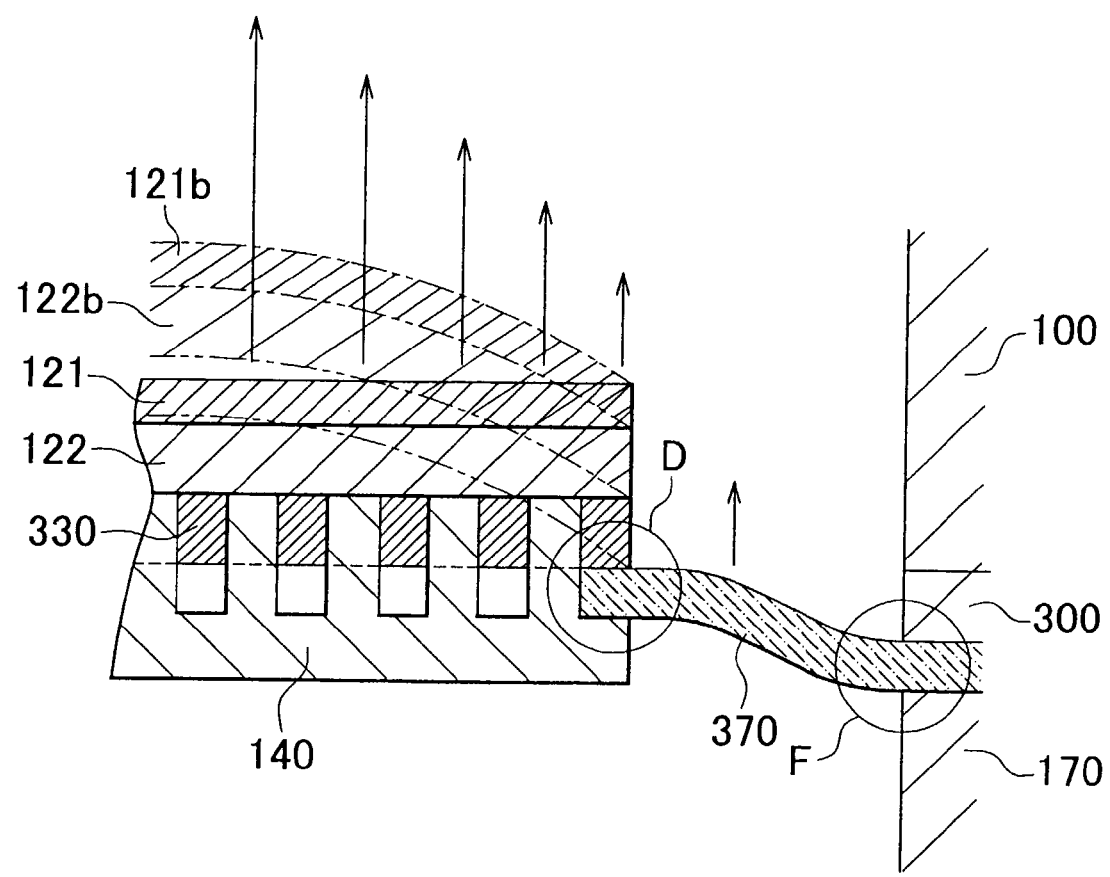
FIG. 11 is a sectional view showing an enlarged portion of the unit cell according to the second embodiment of the invention.

FIG. 10 is a sectional view showing the unit cell 20 according to this embodiment. In the unit cell 20, the hydrogen-permeable metal layer 122 coated with the electrolyte layer 121 is provided on the low thermal expansion member 330. The cathode electrode 110 is provided on the electrolyte layer 121. The stress relaxing member 370 is joined to the peripheral end portion of the power collector 140-side surface of the low thermal expansion member 330 by brazing. The insulating member 300 is held between the stress relaxing member 370 and the gas separator 100. This is because insulation needs to be provided between the gas separator 100 and the stress relaxing member 370 in order to prevent a short circuit since the stress relaxing member 370 is made of aluminum. In a case where the stress relaxing member 370 is made of an insulative material, for example, resin such as rubber, the insulating member 300 may be omitted. FIG. 11 shows an enlarged region surrounded by a circle C in FIG. 10. FIG. 11 schematically shows how the stress relaxing member 370 is deformed so as to relax the stress applied to the electrolyte layer 121, the hydrogen-permeable metal layer 122, and the low thermal expansion member 330 when the fuel cell generates electric power.

B3. Stress Applied to Electrolyte Membrane

FIG. 11 is a sectional view showing an enlarged portion of the unit cell 20 according to this embodiment of the invention. The stress relaxing member 370 is held between the gas separator 100 and the gas separator 170, as shown by a circle F. The low thermal expansion member 330 is joined to the stress relaxing member 370, and fixed to be supported at a portion surrounded by a circle D. When heat is applied to the electrolyte layer 121, the hydrogen-permeable metal layer 122, and the low thermal expansion member 330 due to electric power generation by the fuel cell, thermal expansion occurs in the low thermal expansion member 330, the electrolyte layer 121, and the hydrogen-permeable metal layer 122. As a result, the stress is applied to the low thermal expansion member 330, the electrolyte layer 121, and the hydrogen-permeable metal layer 122. The stress is transmitted to the stress relaxing member 370 which has rigidity lower than that of the low thermal expansion member 330 via the join portion surrounded by the circle D. The stress is focused on portions in the circles D and F, at which the stress relaxing member 370 is fixed. As a result, the stress relaxing member 370 is deformed as shown in FIG. 11. In a case where the low thermal expansion member 330 is directly fixed to the gas separators 100 and 170 without providing the stress relaxing member 370, the electrolyte layer 121, the hydrogen-permeable metal layer 122, and the low thermal expansion member 330 are deformed and curved due to the stress applied thereto, as shown by a chain double-dashed line in FIG. 11. However, since the stress relaxing member 370 is provided, it is possible to prevent the electrolyte layer 121, the hydrogen-permeable metal layer 122, and the low thermal expansion member 300 from being deformed and curved.

According to the second embodiment of the invention that has been described, it is possible to suppress the thermal expansion of the hydrogen-permeable metal layer 122 using the low thermal expansion member 330, and to cause the stress relaxing member 370 to bear the stress which is applied to the low thermal expansion member 330 and the hydrogen-permeable metal layer 122 due to the thermal expansion. Accordingly, it is possible to reduce the shear stress which occurs at the interface between the electrolyte layer 121 and the hydrogen-permeable metal layer 122, and to suppress separation of the electrolyte layer 121 from the hydrogen-permeable metal layer 122, and occurrence of a crack in the electrolyte layer 121.

In the aforementioned second embodiment, the stress relaxing member 370 is held and fixed between the gas separators 100 and 170. However, the stress relaxing member 370 may be joined and fixed to at least one of the gas separators 100 and 170.

B4. Modified Example of Second Embodiment

Figure 12:
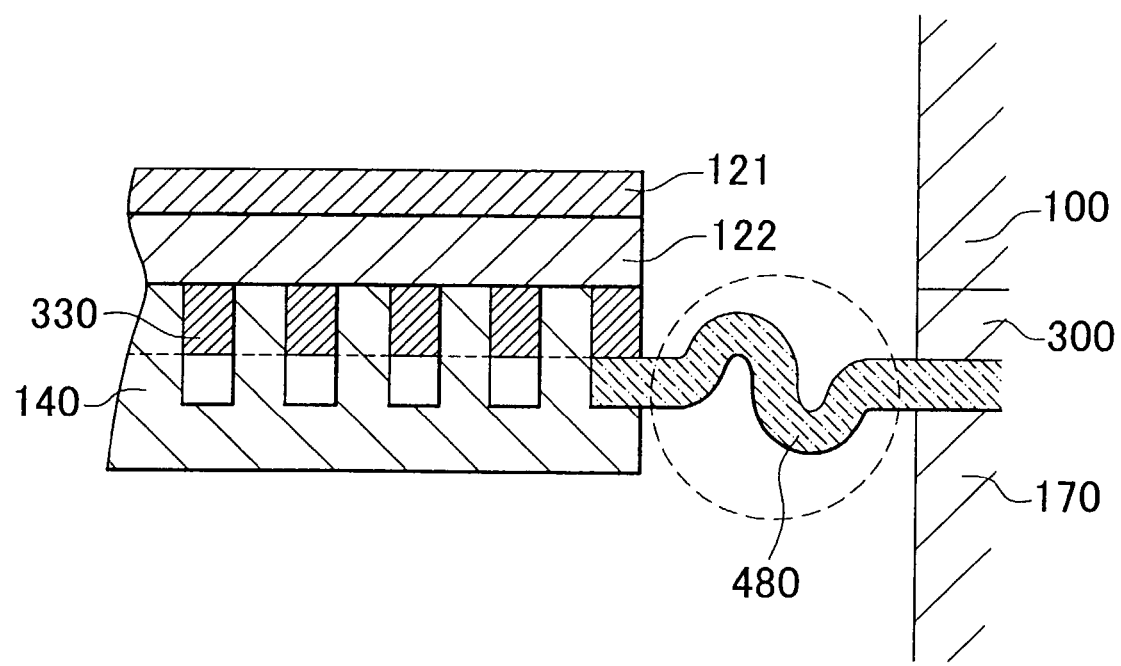
FIG. 12 is an explanatory diagram showing a modified example of the second embodiment of the invention.

FIG. 12 is an explanatory diagram showing a modified example of the second embodiment. FIG. 12 is a sectional view showing an enlarged portion of the unit cell 20. Since the configuration of each member is the same as in the second embodiment, description thereof will be omitted. The stress relaxing member 480 may be metal having a spring shape as shown by a dashed circle. With this configuration, the stress transmitted from the low thermal expansion member 330 is focused on a portion with extremely low rigidity, which is surrounded by a dashed circle. Accordingly, it is possible to efficiently relax the stress applied to the low thermal expansion member 330, the hydrogen-permeable metal layer 122, and the electrolyte layer 121. For example, the stress relaxing member 480 may be a thin metal plate whose section has a spring shape. Also, a portion of the stress relaxing member 480 which is positioned outside a dashed circle may include metal having a spring constant.

C. Modified Example

Although various embodiments have been described, the invention is not limited to these embodiments. It is to be understood that various modifications can be made to the embodiments in the scope of the invention.

The invention claimed is:

1. A membrane-electrode assembly for use in a fuel cell having a pair of separators for holding the membrane-electrode assembly therebetween, said membrane-electrode assembly comprising:
    a hydrogen-permeable metal layer containing hydrogen-permeable metal;
    an electrolyte layer with proton conductivity which is provided on the hydrogen-permeable metal layer; and
    a low thermal expansion member provided on a surface of the hydrogen-permeable metal layer, the surface being opposite to a surface of the hydrogen-permeable metal layer on which the electrolyte layer is provided,
    wherein a thermal expansion coefficient of the low thermal expansion member is lower than that of the hydrogen-permeable metal layer, and the low thermal expansion member includes a fitting portion which is formed having a recess portion on a surface of the low thermal expansion member on which the hydrogen-permeable metal layer is provided, and the hydrogen-permeable metal layer is fitted in the fitting portion.

2. The membrane-electrode assembly according to claim 1, wherein a passage for supplying reaction gas to the hydrogen-permeable metal layer is formed on a bottom of the fitting portion so as to penetrate the low thermal expansion member.

3. A fuel cell comprising:
    the membrane-electrode assembly according to claim 1; and
    a pair of separators between which the membrane-electrode assembly is held.

4. A fuel cell according to claim 3, wherein the hydrogen-permeable metal layer serves as an anode electrode, and the membrane-electrode assembly includes a cathode electrode which is provided on the electrolyte layer.

5. The fuel cell according to claim 4, wherein
the fuel cell includes a stress relaxing member which is joined to a surface of the low thermal expansion member, the surface being opposite to a surface of the low thermal expansion member on which the hydrogen-permeable metal layer is provided,
the stress relaxing member has rigidity lower than that of the low thermal expansion member; and
a portion of the stress relaxing member is partly fixed to at least one of the pair of separators, the portion having no contact with the low thermal expansion member.

6. The fuel cell according to claim 4, wherein
the membrane-electrode assembly is provided such that a predetermined space is provided between the membrane-electrode assembly and the pair of separators in a direction perpendicular to a direction in which the hydrogen-permeable metal layer, the electrolyte layer, and the low thermal expansion member are stacked.

7. The fuel cell according to claim 5, wherein
the membrane-electrode assembly is provided such that a predetermined space is provided between the membrane-electrode assembly and the pair of separators in a direction perpendicular to a direction in which the hydrogen-permeable metal layer, the electrolyte layer, and the low thermal expansion member are stacked.

* * * * *